United States Patent Office.

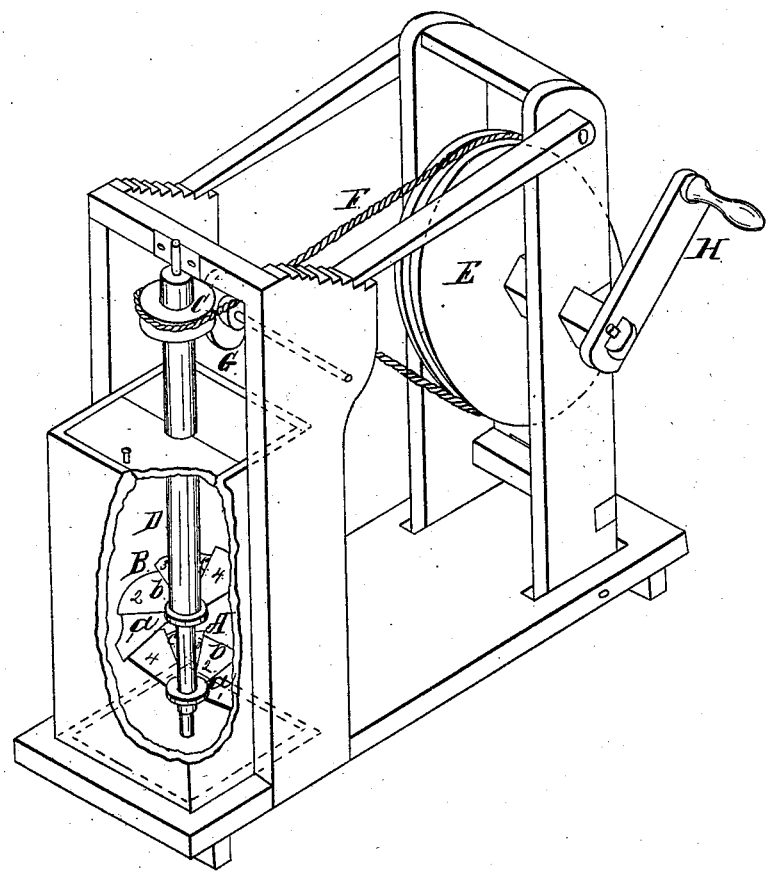

JOHN S. CARSON, OF BROOKHAVEN, MISSISSIPPI.

Letters Patent No. 81,341, dated August 25, 1868.

IMPROVEMENT IN CHURNS.

The Schedule referred to in these Letters Patent and making part of the same.

TO ALL WHOM IT MAY CONCERN:

Be it known that I, JOHN S. CARSON, of Brookhaven, in the county of Lawrence, and State of Mississippi, have invented a certain new, useful, and improved Churn-Dasher, and mode of operating the same; and I do hereby declare the following to be a full, clear, and exact description of the same, reference being had to the annexed drawing, making a part of this specification.

My invention consists of one or more sections of a sectional helix, the sections consisting of about ninety degrees of a complete helix, which is made up of four or more divisional parts, so placed as that there is a narrow opening or space at the point where they overlap each other by curved extremities, so as to afford a passage for portions of the milk between them, whilst, at the same time, checking and deflecting the same into diverse directions.

But my invention will be better and more quickly understood by referring to the drawing, which exhibits a churn with a part broken away to show my improved dasher, with the framework and gearing which I have devised and use in connection therewith.

The drawing shows two sections, A and B, of a helix or spiral vane, each being subdivided into four sections, 1 2 3 4. The helical line is not continuous, but broken by this subdivision in such manner that three openings, $a \, b \, c$, obtain, through which the milk may pass as the vanes rotate in either direction. Nor are the sections 1 2 3 4 merely parts of a true spiral flange. Each of them is abruptly curved at both its extremities, so as to produce a corresponding curvature or deflection in the opening, and therefore in the currents of milk that, in the rotation of the dasher, are forced through this opening, and thus is created a more violent agitation of the same, and a more rapid formation or collection of the butter.

In the operation of churning, my dasher is rotated first in one and then in the reverse direction, a few revolutions only being made in either direction, which rotation I effect by means of a pulley, C, near the upper extremity of the spindle D, and a driving-wheel, E, through the agency of a band, F, and a crank, H. An intermediate pulley, G, deflects and tightens the band or cord in the proper direction, to maintain it on pulleys C and E, notwithstanding one has a vertical and the other a horizontal axis, to the proper degree of tension. I am thus, by having the driving-pulley E very much larger than pulley C, enabled to give as rapid a motion to my dasher as I please, and to reverse the direction of its rotation at pleasure, and also to increase the power in proportion to the quantity of milk in the churn, whilst, by having the axis of the driving-pulley horizontal, I relieve the operator of the fatigue always involved in the turning of a crank on a vertical shaft.

One helical dasher in sections or parts will secure a rapid coming of the butter, but I prefer to use two, as shown in the drawing, whenever there is a large quantity of milk in the churn, that are so placed as that, if they were continued, they would cut or cross each other as they wind around the spindle, for by the use of two, a greater number of diverse currents are set in motion, and a more tumultuous agitation of the milk secured. With my dasher, a square churn is best, and I prefer that it should be made, like the dasher, of tin or other like metal.

Having thus described my invention, what I claim, and desire to secure by Letters Patent, is—

1. The sectional helix dasher A B; when the same is composed of the sections or parts 1 2 3 4, constructed and relatively arranged as described, for the purpose set forth.

2. The sectional helix dasher A B, when constructed as described, in combination with the pulley C, the driving-wheel E, the band or cord F, and the crank H, the whole being arranged for conjoint operation, substantially as shown and described, for the purpose set forth.

JOHN S. CARSON.

Witnesses:
C. W. WAILEY,
RUFUS R. RHODES.